US008614719B2

(12) United States Patent
Zarubinsky et al.

(10) Patent No.: US 8,614,719 B2
(45) Date of Patent: Dec. 24, 2013

(54) METHOD FOR GAMMA CORRECTION AND A DEVICE HAVING GAMMA CORRECTION CAPABILITIES

(75) Inventors: Michael Zarubinsky, Rishon-Lezion (IL); Konstantin Berman, Petah-Tikva (IL); Arnold Yanof, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1013 days.

(21) Appl. No.: 12/305,160

(22) PCT Filed: Jul. 12, 2006

(86) PCT No.: PCT/IB2006/052355
§ 371 (c)(1),
(2), (4) Date: Dec. 16, 2008

(87) PCT Pub. No.: WO2008/010023
PCT Pub. Date: Jan. 24, 2008

(65) Prior Publication Data
US 2009/0207191 A1    Aug. 20, 2009

(51) Int. Cl.
*G09G 5/10* (2006.01)
*H04N 5/228* (2006.01)
*H04N 5/202* (2006.01)
*H04N 9/69* (2006.01)

(52) U.S. Cl.
USPC ......... 345/690; 348/222.1; 348/674; 348/675

(58) Field of Classification Search
USPC .............. 348/254, 625, 674–675, 222.1, 672, 348/234, 744, 237, 711, 231.99; 345/60, 345/77, 692, 690; 382/260, 274; 315/169.1; 370/208; 396/82; 700/28
See application file for complete search history.

(56) References Cited

U.S. PATENT DOCUMENTS

| 5,473,373 | A | 12/1995 | Hwung et al. | |
|---|---|---|---|---|
| 5,818,521 | A * | 10/1998 | Hieda | 348/222.1 |
| 6,278,496 | B1 | 8/2001 | Kitagawa et al. | |
| 6,340,996 | B1 * | 1/2002 | Nakamura | 348/675 |
| 2001/0035850 | A1 * | 11/2001 | Okamoto et al. | 345/77 |
| 2004/0061790 | A1 * | 4/2004 | Tanji et al. | 348/222.1 |
| 2004/0246278 | A1 * | 12/2004 | Elliott | 345/692 |
| 2005/0200761 | A1 * | 9/2005 | Fukue et al. | 348/674 |
| 2006/0164524 | A1 * | 7/2006 | Shibano et al. | 348/234 |
| 2007/0210996 | A1 * | 9/2007 | Mizukoshi et al. | 345/77 |
| 2011/0122272 | A1 * | 5/2011 | Fergason | 348/222.1 |

FOREIGN PATENT DOCUMENTS

| EP | 0457522 B1 | 11/1991 |
|---|---|---|
| EP | 0757477 B1 | 2/1997 |
| JP | 06-233131 | 8/1994 |

OTHER PUBLICATIONS

PCT/IB2006/52355 International Search Report and Written Opinion mailed Dec. 2, 2007.

* cited by examiner

*Primary Examiner* — Quan-Zhen Wang
*Assistant Examiner* — Lin Li (57) ABSTRACT

A device can perform gamma correction by receiving a non-gamma compensated input; selecting, in response to the input value, a selected approximating interval out of a group of low-brightness approximating intervals and out of a group of high-brightness approximating intervals; multiplying a portion of the input value by a selected approximating interval slope to provide an intermediate result; adding the intermediate result to a selected approximating interval offset to provide the gamma compensated output value; and outputting a gamma compensated output value.

20 Claims, 6 Drawing Sheets

Defining or receiving a definition of a group of high-brightness approximating intervals and the group of low-brightness approximating intervals. At least one low-brightness approximating interval is smaller than at least one high-brightness approximating interval. Conveniently, the width of input pixel values that correspond to a single. The length of one low-brightness approximating interval can be smaller than the length of at least one other low-brightness. The range of input pixel values that correspond to a single low-brightness approximating interval can differ that a power of two. A low-brightness approximating interval is characterized by a low-brightness approximating interval slope and by a low-brightness approximating interval offset. The low-brightness approximating interval offset is representative of an imaginary intersection point between a output value axis and between an imaginary line that extends from the low-brightness approximating interval towards the output value axis while having the low-brightness approximating interval slope. A high-brightness approximating interval is characterized by a high-brightness approximating interval slope and by a high-brightness approximating interval offset representative of a start point of the high-brightness approximating interval.
205 receiving a non-gamma compensated input value.
210 selecting, in response to the input value, a selected approximating interval out of a group of low-brightness approximating intervals and out of a group of high-brightness approximating intervals.
220 providing, to a multiplier, the selected approximating interval slope from a selected slope providing circuit out of (i) a low-brightness slope providing circuit, and a (ii) high-brightness slope providing circuit.
250 multiplying a portion of the input value by a selected approximating interval slope to provide an intermediate result.
260 providing, to an adder, the selected approximating interval offset from a selected offset providing circuit out of a low-brightness offset providing circuit and a high-brightness offset providing circuit
270

Adding the intermediate result to a selected approximating interval offset to provide the gamma compensated output value.
280

METHOD FOR GAMMA CORRECTION AND A DEVICE HAVING GAMMA CORRECTION CAPABILITIES

FIELD OF THE INVENTION

The present invention relates to methods for gamma correction and for devices having gamma correction capabilities.

BACKGROUND OF THE INVENTION

Certain displays, image sensors and even the human eye have a non-linear transfer function. In order to compensate for this non-linearity a substantially inverse correction function is applied. This compensation stage is also known as gamma ($\gamma$) correction.

The gamma correction function can be represented by the following equation: $Y(X)=X^{1/\gamma}$, wherein X represents a non-compensated pixel value (for example brightness or contrast), Y is the gamma compensated pixel value and $\gamma$ is the gamma factor that is characteristic of the non-linear transfer function that is compensated by the correction function.

Digital systems and digital image conversion methods use an approximation of the gamma correction function in order to perform gamma compensation. One method includes applying a linear approximation of the gamma correction function for a certain range of brightness levels while applying a non-linear approximation of the gamma correction function for another range of brightness levels. Another solution involves storing information representative of multiple gamma correction curves in a memory unit, selecting one of the curves in response to the kind or purpose of the image being gamma compensated and applying a linear function on the selected information to provide gamma compensated pixel information. The following patents and patent applications, all being incorporated herein by reference, illustrate some prior art method and devices for applying gamma compensation: U.S. Pat. No. 5,473,373 of Hwung et al., titled "Digital camera correction system for low, medium and high intensity video signals, with linear and non-linear correction", European patent application EP0757477A2 of Tanji et al., titled "Video signal processing and video camera", and Japanese patent application JP1993000013588 OF Asano titled "Gamma correction for digital image".

There is a need to provide an efficient method and device for performing gamma corrections, especially for low-brightness levels.

SUMMARY OF THE PRESENT INVENTION

A method for gamma correction devices having gamma correction capabilities, as described in the accompanying claims.

BRIEF DESCRIPTION OF THE DRAWINGS

The present invention will be understood and appreciated more fully from the following detailed description taken in conjunction with the drawings in which:

FIG. 6 illustrates a method for gamma compensation according to an embodiment of the invention.

DETAILED DESCRIPTION OF PREFERRED EMBODIMENTS

Embodiments of the present invention illustrated in the accompanying drawings provide an information processing apparatus such as a mobile phone, a personal data accessory or a media player that includes a device that is capable of gamma correction.

Figure 1:
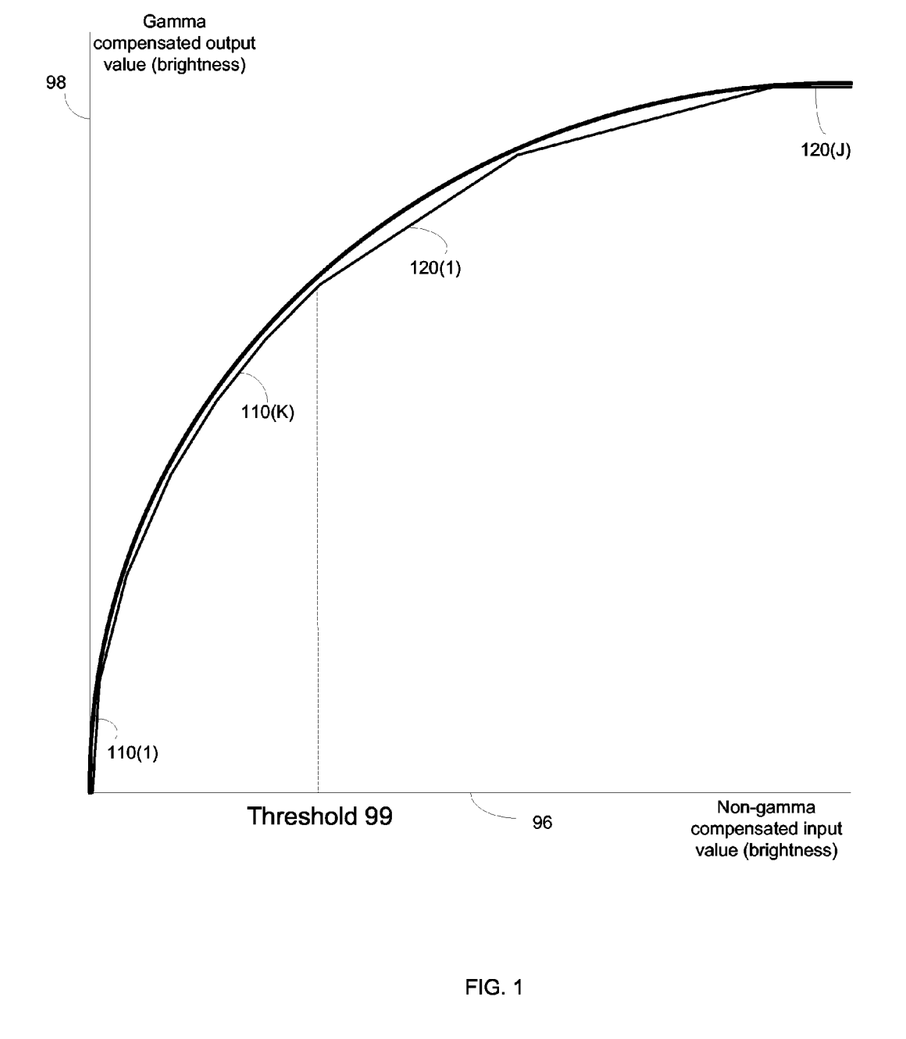
FIG. 1-2 illustrate a gamma correction curve and an approximated gamma correction curve, according to an embodiment of the invention.
Figure 2:
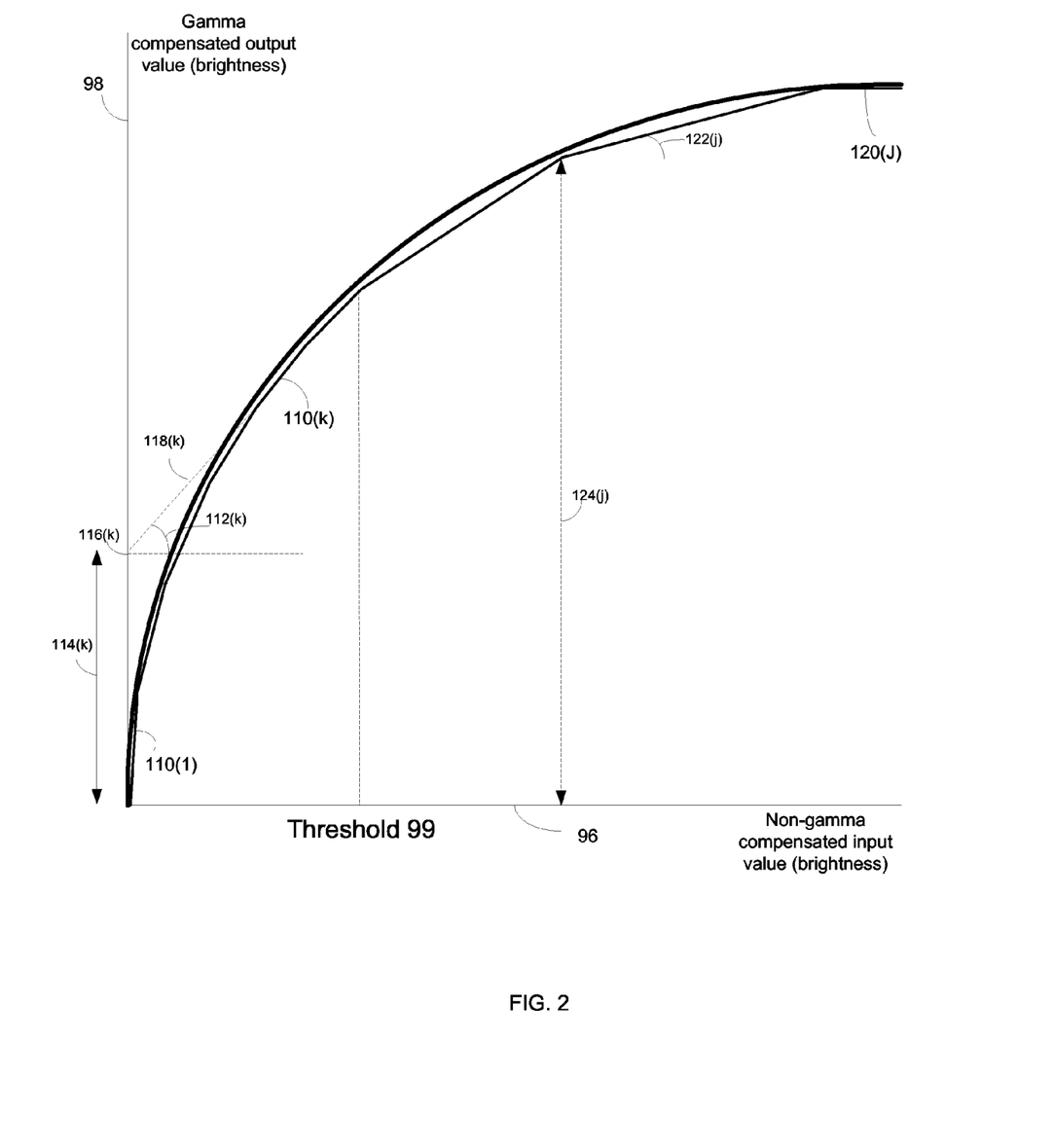

FIG. 1-2 illustrate gamma correction curve 90 and approximated gamma correction curve 100, according to an embodiment of the invention.

Gamma correction curve 90 graphically illustrates the equation $Y(X)=X^{1/\gamma}$ for a certain value of gamma.

Approximated gamma correction curve 100 includes multiple approximation intervals such as low-brightness approximating intervals 110(1)-110(K) and high-brightness approximating intervals 120(1)-120(J). J and K are positive integers that represent the number of low-brightness approximation intervals and high-brightness approximation intervals. K can equal J but can differ than J. K and J can be equal to a power of two but this is not necessarily so.

Low-brightness approximating intervals 110(1)-110(K) are used to approximate the gamma correction curve below an intermediate brightness threshold 99 while the high-brightness approximating intervals 120(1)-120(J) are used to approximate the gamma correction curve above the intermediate brightness threshold 99. The intermediate brightness threshold 99 can be defined in various manners, typically in response to the number of bits that are used for representing non-gamma compensated input values and/or gamma compensated output values. The inventors used input values that range between zero and two hundred and fifty six, while the intermediate brightness threshold 99 equals sixty-four.

X-axis 96 illustrates non-gamma compensated input values (such as brightness) while the Y axis (also referred to as output value axis) 98 illustrates the gamma compensated output values.

Different low-brightness approximating intervals have different lengths. Conveniently, smaller brightness levels are approximated by smaller low-brightness approximating intervals.

The range of input pixel values that correspond to a single low-brightness approximating interval can differ that a power of two. Thus, the low-brightness approximating intervals can differ from 0-15, 16-31, 32-63, 64-127 and 128-255. In addition the number of low-brightness approximating intervals can exceed five, thus providing more accurate approximation.

A low-brightness approximating interval (generally referred to as 110(k), whereas index k can range between 1 and K) is characterized by a low-brightness approximating interval slope 112(k) and by a low-brightness approximating interval offset 114(k). Low-brightness approximating interval offset 114(k) is representative of an imaginary intersection point 116(k) between output value axis 98 and between an imaginary line 118(k) that extends from low-brightness approximating interval 110(k) towards output value axis 98 while having the low-brightness approximating interval slope. Low-brightness approximating interval offset 114(k) can equal the value of the imaginary intersection point 118(k).

A high-brightness approximating interval (generally referred to as 120(j), whereas index j can range between 1 and J) is characterized by a high-brightness approximating interval slope 122(j) and by a high-brightness approximating interval offset 124(j) representative of a start point of the high-brightness approximating interval.

A typical gamma correction stage includes multiplying a non-gamma compensated input value by a selected approximating interval slope and adding the result to the selected approximating interval offset.

Figure 3:
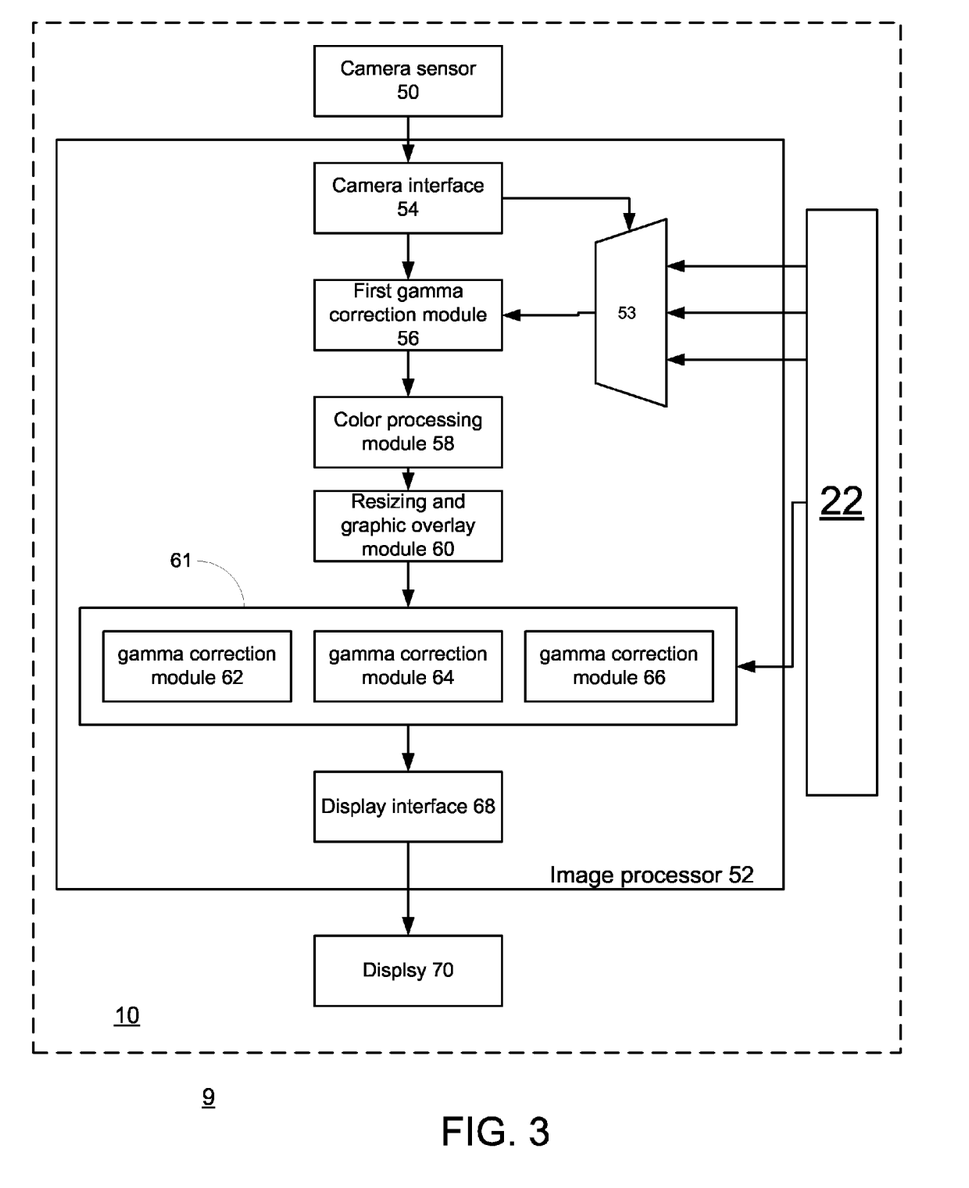
FIG. 3 illustrates an apparatus according to an embodiment of the invention.

FIG. 3 illustrates an apparatus 9 according to an embodiment of the invention. Apparatus 9 is an information (data and/or media) processing apparatus and can include device 10. Apparatus 9 can be a mobile device such as but not limited to laptop computer, a mobile phone, a media player, a mobile game console and the like. Apparatus 9 can also be a stationary apparatus such as a desktop computer, a plasma screen, a television, a media entertainment system, a security/monitoring system, a stationary game console and the like.

Device 10 can include one or more integrated circuits. It performs gamma conversion to signals that are received from camera sensor 50, and also performs gamma corrections to signals that are sent to display 70. It is noted that apparatus 9 can include only a single gamma conversion circuit or more than two data conversion circuits.

Device 10 includes camera sensor 50, image processor 52, memory unit 22 and display 70. The camera sensor is characterized by a camera sensor gamma factor while the display 70 is characterized by a display gamma factor. These factors can differ from each other or can equal each other.

Image processor 52 can include hardware and software components that perform various image processing operations including gamma processing.

Conveniently, signals from camera sensor 50 are provided to camera interface 54 and then to first gamma correction module 56. The camera interface 54 can receive serial information representative of pixel values from a multi-color camera sensor 50. The serial provision of information can be responsive to the configuration of the camera sensor 50 and to the scanning pattern of the camera sensor. The inventors used a Bayer configuration camera sensor 50 but other configurations can be implemented. In addition the camera interface can receive information in parallel.

Camera interface 54 selects gamma correction slope and offset information (including low-brightness and high-brightness approximating interval slope and offsets) that are provided to first gamma correction module 56, in response to the serially received information from camera sensor 50.

First gamma correction module 56 performs a first gamma correction stage and provides the gamma compensated output values to color processor module 58. The correction is responsive to the camera sensor gamma factor.

Color processor module 58 can perform various color processing stages and output image information to resizing and graphic overlay module 60. Resizing and graphic overlay module 60 can perform resizing and overlay graphics and provide information to second gamma correction stage 61 that includes a gamma correction modules 62-66, a gamma correction module for each color component (red, green and blue). Second gamma correction stage 61 performs that gamma correction in response to the display sensor gamma factor.

Gamma correction modules 62-66 provide gamma compensated output values to display interface 68 that in turn provides the gamma compensated output values to display 70.

Figure 4:
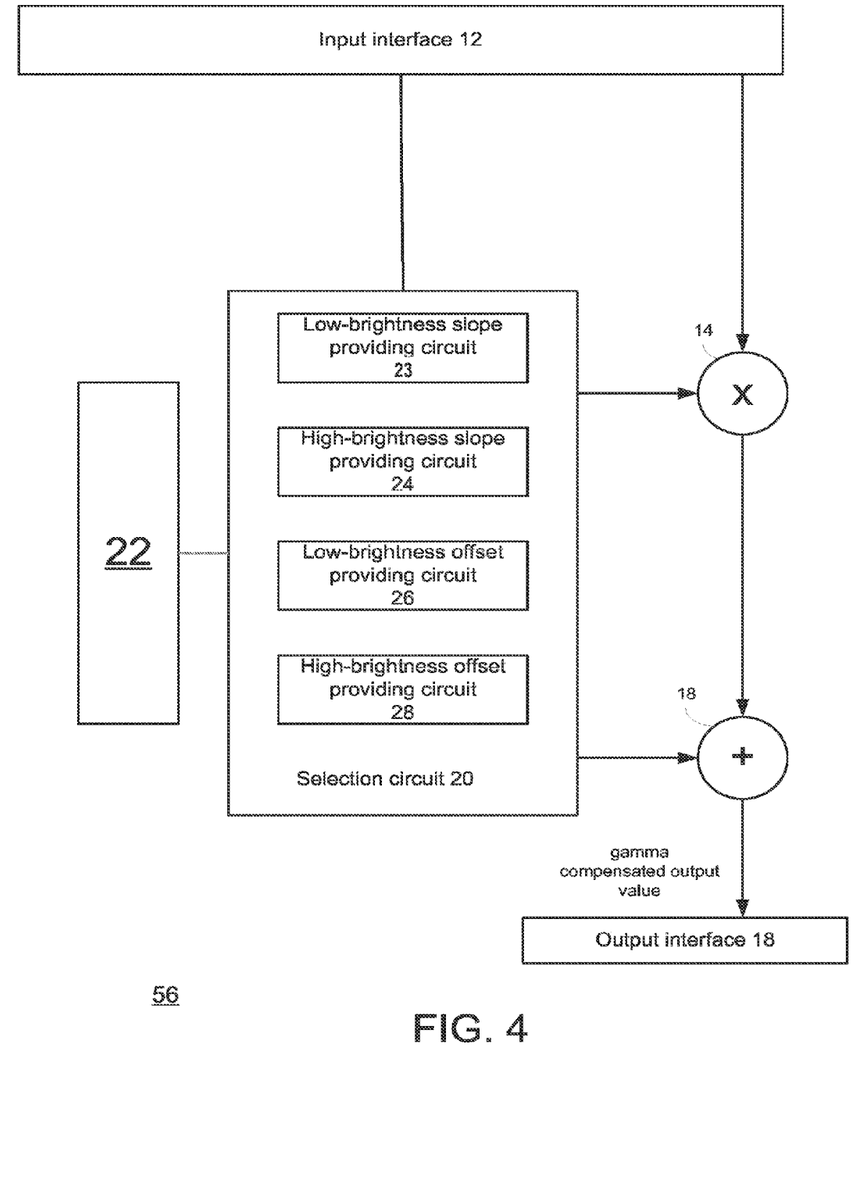
FIG. 4 illustrates a gamma correction module according to an embodiment of the invention.

FIG. 4 illustrates gamma correction module 56 according to an embodiment of the invention.

Gamma correction module 56 includes: (i) input interface 12 adapted to receive a non-gamma compensated input value, (ii) output interface 18 adapted to output a gamma compensated output value, (iii) selection circuit 20, (iv) memory unit 22, (v) multiplier 14, (vi) adder 16, and (vii) selection circuit 20 that is adapted to select, in response to the input value, a selected approximating interval out of a group of low-brightness approximating intervals and out of a group of high-brightness approximating intervals. The memory unit 22 is adapted to store information representative of the group of low-brightness approximating intervals and of the group of high-brightness approximating intervals. At least one low-brightness approximating interval is smaller than at least one high-brightness approximating interval and wherein at least one low-brightness approximating interval is smaller than at least one other low-brightness. A low-brightness approximating interval is characterized by a low-brightness approximating interval slope and by a low-brightness approximating interval offset representative of an imaginary intersection point between a output value axis and between an imaginary line that extends from the low-brightness approximating interval towards the output value axis while having the low-brightness approximating interval slope. A high-brightness approximating interval is characterized by a high-brightness approximating interval slope and by a high-brightness approximating interval offset representative of a start point of the high-brightness approximating interval.

Multiplier 14 is connected to input interface 12 and to adder 16 and is adapted to multiply a portion of the input value by a selected approximating interval slope to provide an intermediate result. Adder 16 is connected to the output interface 18 and is adapted to add the intermediate result to a selected approximating interval offset to provide the gamma compensated output value.

Conveniently, device 10 includes processor 30 that is adapted to generate the information representative of the group of low-brightness approximating intervals and of the group of high-brightness approximating intervals. The generation can include receiving information representative of requested approximating interval start point, end point and/or slope and calculating the low-brightness approximating intervals offset and slopes and the high-brightness approximating intervals offset and slopes. According to an embodiment of the invention processor 30 calculates just the low-brightness approximating intervals offset and slopes.

Selection circuit 20 includes: (i) low-brightness slope providing circuit 23, (ii) high-brightness slope providing circuit 24, (iii) low-brightness offset providing circuit 26 and (iv) high-brightness offset providing circuit 28.

Selection circuit 20 is adapted to provide to multiplexer 14 the selected approximating interval slope from a selected slope providing circuit out of the low-brightness slope providing circuit 23 and the high-brightness slope providing circuit 24. Selection circuit 20 is adapted to provide to adder 16 the selected approximating interval offset from a selected offset providing circuit out of low-brightness offset providing circuit 26 and high-brightness offset providing circuit 28.

Figure 5:
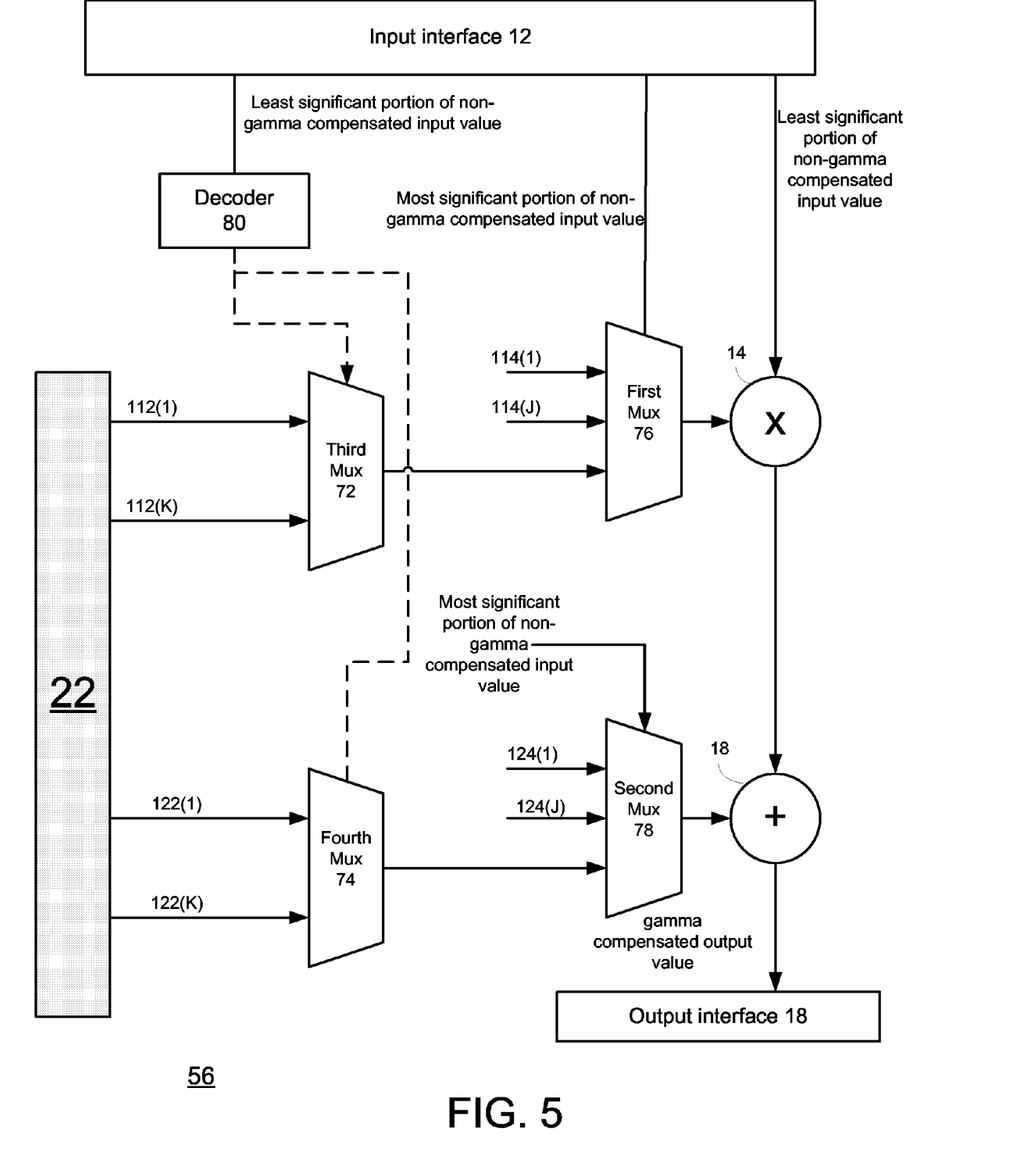
FIG. 5 illustrates in greater details a gamma correction module according to an embodiment of the invention.

FIG. 5 illustrates in greater details gamma correction module 56 according to an embodiment of the invention.

Gamma correction module 56 includes decoder 80, first till fourth multiplexers 72-78, multiplier 14 and adder 16.

Fourth multiplexer 74 is connected to multiple registers (or to multiple entries of memory unit 22) that store low-brightness approximation interval offsets 114(1)-114(K). It can select low-brightness approximation interval offset in response to a control signal provided by decoder 80. The selected low-brightness approximation interval offset is provided to one of the inputs of second multiplexer 78 that is also connected to multiple registers (or to multiple entries of memory unit 22) that store high-brightness approximation interval offsets 124(1)-124(J). Second multiplexer 78 sends (In response to the most significant portion of the input value) to adder 16 a selected approximation interval offset that is then added to the output of multiplier 14.

Fourth multiplexer 78 is connected to multiple registers (or to multiple entries of memory unit 22) that store low-brightness approximation interval slopes 112(1)-112(K). It can select low-brightness approximation interval slope in response to a control signal provided by decoder 80. The selected low-brightness approximation interval slope is provided to one of the inputs of first multiplexer 76 that is also connected to multiple registers (or to multiple entries of memory unit 22) that store high-brightness approximation interval slopes 122(1)-122(J). First multiplexer 76 sends (in response to the most significant portion of the input value) to multiplier 14 a selected approximation interval slope that is then multiplied by a least significant portion the input value.

Low-brightness slope providing circuit 23 includes a portion of memory unit 22, third multiplexer 72 and even first multiplexer 76. High-brightness slope providing circuit 24 includes a portion of memory unit 22 and first multiplexer 76. Low-brightness offset providing circuit 26 includes a portion of memory unit 22, fourth multiplexer 74 and even second multiplexer 78. High-brightness offset providing circuit 28 includes a portion of memory unit 22 and second multiplexer 78.

The most significant portion of the non-gamma compensated input value is used to select either the group of low-brightness approximating intervals or one of the high-brightness approximating intervals. The least significant portion of the non-gamma compensated input value is send to decoder 80 and is used to select one of the low-brightness approximating intervals. Decoder 80 includes a mapping between values of the least significant portion of the non-gamma compensated input value and the K approximating intervals slopes or offsets. Conveniently the mapping is a one to one mapping. For example if the value of the least significant portion of the non-gamma compensated input value equals k then the slope and the offset of the k'th low-brightness approximating interval are selected.

The inventors used an eight bit non-gamma compensated input value. The most significant portion included two bits while the remaining six bits formed the least significant portion.

FIG. 6 illustrates method 200 for gamma compensation according to an embodiment of the invention.

Method 200 starts by stage 205 of defining or receiving a definition of a group of high-brightness approximating intervals and the group of low-brightness approximating intervals. The definition can include defining multiple approximating intervals such as low-brightness approximating intervals 110(1)-110(K) and high-brightness approximating intervals 120(1)-120(J).

At least one low-brightness approximating interval is smaller than at least one high-brightness approximating interval. Conveniently, the width of input pixel values that correspond to a single The length of one low-brightness approximating interval can be smaller than the length of at least one other low-brightness. The range of input pixel values that correspond to a single low-brightness approximating interval can differ that a power of two.

A low-brightness approximating interval is characterized by a low-brightness approximating interval slope and by a low-brightness approximating interval offset. The low-brightness approximating interval offset is representative of an imaginary intersection point between an output value axis and between an imaginary line that extends from the low-brightness approximating interval towards the output value axis while having the low-brightness approximating interval slope.

A high-brightness approximating interval is characterized by a high-brightness approximating interval slope and by a high-brightness approximating interval offset representative of a start point of the high-brightness approximating interval.

Conveniently, a non-gamma compensated input value includes a least significant portion and a most significant portion. Each high-brightness approximating interval is associates with a unique value of the most significant portion. The values of most significant portion indicate whet is the starting point for each high-brightness approximating interval.

A single value of the most significant portion is associated with the group of low-brightness approximating intervals. Accordingly, the most significant portion of the non-gamma compensated input value is not indicative of the start point of each low-brightness approximating interval. In order to efficiently provide gamma compensated output values for low-brightness input values the low-brightness approximating interval offsets that are representative of imaginary intersection points with the output value axis and are not representative of the start point of each low-brightness approximating interval.

Conveniently, the number of low-brightness approximating intervals that belong to the group of low-brightness approximating intervals differs from a number of high-brightness approximating intervals that belong to the group of high-brightness approximating intervals.

Conveniently, the number of low-brightness approximating intervals that belong to the group of low-brightness approximating intervals exceeds five.

Conveniently, a width of a low-brightness value range associated with the group of low-brightness approximating intervals is substantially equal to a width of high-brightness values associated with a single high-brightness approximating interval.

Stage 205 is followed by stage 210 of receiving a non-gamma compensated input value. This may include receiving one or more non-gamma compensated input values. For example, referring to FIG. 3, first gamma correction module 56 can receive one or more non-gamma compensated values from camera interface 54. Second gamma correction stage 61 can receive non-gamma compensated values from resizing and graphic overlay module 66.

Stage 210 is followed by stage 220 of selecting, in response to the input value, a selected approximating interval out of a group of low-brightness approximating intervals and out of a group of high-brightness approximating intervals.

For example, referring to FIG. 5, first gamma correction module 56 can perform the selection in response to the most significant portion and the least significant portion of the non-gamma compensated input value a slope and a offset that are associated with a selected approximating interval.

Stage 220 is followed by stage 250 of providing, to a multiplier, the selected approximating interval slope from a selected slope providing circuit out of (i) a low-brightness slope providing circuit, and a (ii) high-brightness slope providing circuit.

For example, referring to FIG. 4 and FIG. 5 the multiplier can be multiplier 14.

Stage 250 is followed by stage 260 of multiplying a portion of the input value by a selected approximating interval slope to provide an intermediate result.

Stage 260 is followed by stage 270 of providing, to an adder, the selected approximating interval offset from a selected offset providing circuit out of a low-brightness offset providing circuit and a high-brightness offset providing circuit.

For example, referring to FIG. 4 and FIG. 5 the adder can be adder 16.

Stage 270 is followed by stage 280 of adding the intermediate result to a selected approximating interval offset to provide the gamma compensated output value.

It is noted that method 200 can include processing one or more non-gamma compensated gamma input values in a serial manner or in parallel. For example, when a pixel is represented by multiple (for example 3 or 4) color components then each color component (for example red, green and blue) can be represented by a single input value and be associated with different gamma correction functions. Method 200 can include processing one color component after the other or processing multiple color components in parallel.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

We claim:

1. A device for gamma compensation the device comprises:
an input interface adapted to receive a non-gamma compensated input value and an output interface adapted to output a gamma compensated output value;
a selection circuit comprising a low-brightness slope providing circuit, a high-brightness slope providing circuit, a low-brightness offset providing circuit and a high-brightness offset providing circuit, wherein the selection circuit is coupled to a memory unit, to a multiplier and to an adder, wherein the selection circuit is adapted to select, in response to the input value, a selected approximating interval out of a group of low-brightness approximating intervals and out of a group of high-brightness approximating intervals;
wherein the memory unit is adapted to store information representative of the group of low-brightness approximating intervals and of the group of high-brightness approximating intervals; wherein at least one low-brightness approximating interval is smaller than at least one high-brightness approximating interval and wherein at least one low-brightness approximating interval is smaller than at least one other low-brightness;
wherein a low-brightness approximating interval is characterized by a low-brightness approximating interval slope and by a low-brightness approximating interval offset representative of an imaginary intersection point between an output value axis and an imaginary line that extends from the low-brightness approximating interval towards the output value axis while having the low-brightness approximating interval slope;
wherein a high-brightness approximating interval is characterized by a high-brightness approximating interval slope and by a high-brightness approximating interval offset representative of a start point of the high-brightness approximating interval;
wherein the multiplier further coupled to the input interface and to the adder and is adapted to multiply a portion of the input value by a selected approximating interval slope to provide an intermediate result;
wherein the adder is further coupled to the output interface and is adapted to add the intermediate result to a selected approximating interval offset to provide the gamma compensated output value.

2. The device according to claim 1 wherein the selection circuit is adapted to provide to the multiplexer the selected approximating interval slope from a selected slope providing circuit out of the low-brightness slope providing circuit and the high-brightness slope providing circuit.

3. The device according to claim 1 wherein the selection circuit is adapted to provide to the adder the selected approximating interval offset from a selected offset providing circuit out of the low-brightness offset providing circuit and the high-brightness offset providing circuit.

4. The device according to claim 1 wherein the number of low-brightness approximating intervals that belong to the group of low-brightness approximating intervals differs from a number of high-brightness approximating intervals that belong to the group of high-brightness approximating intervals.

5. The device according to claim 1 wherein the number of low-brightness approximating intervals that belong to the group of low-brightness approximating intervals exceeds five.

6. The device according claim 1 wherein a width of a low-brightness value range associated with the group of low-brightness approximating intervals is substantially equal to a width of high-brightness values associated with a single high-brightness approximating interval.

7. The device according claim 1 wherein a pixel is represented by multiple non-gamma compensated color component values; wherein device is adapted to generate multiple gamma compensated color component values in parallel.

8. The device according to any claim of claim 1 further comprising a processor adapted to define the group of high-brightness approximating intervals and the group of low-brightness approximating intervals.

9. A method for gamma compensation the method comprises:
receiving a non-gamma compensated input value and outputting a gamma compensated output value; selecting, in response to the input value in relation to an intermediate brightness threshold, a selected approximating interval out of a group of low-brightness approximating intervals when the input value is below the intermediate brightness threshold and out of a group of high-brightness approximating intervals when the input value is above the intermediate brightness threshold;
wherein at least one low-brightness approximating interval is smaller than at least one high-brightness approximating interval and wherein at least one low-brightness approximating interval is smaller than at least one other low-brightness approximating interval;
wherein a low-brightness approximating interval is characterized by a low-brightness approximating interval slope and by a low-brightness approximating interval offset representative of an imaginary intersection point between a output value axis and between an imaginary line that extends from the low-brightness approximating interval towards the output value axis while having the low-brightness approximating interval slope;
wherein a high-brightness approximating interval is characterized by a high-brightness approximating interval slope and by a high-brightness approximating interval offset representative of a start point of the high-brightness approximating interval;

multiplying a portion of the non-gamma compensated input value by a selected approximating interval slope to provide an intermediate result;

adding the intermediate result to a selected approximating interval offset to provide the gamma compensated output value.

10. The method according to claim 9 wherein the multiplying is preceded by providing, to a multiplier, the selected approximating interval slope from a selected slope providing circuit out of a low-brightness slope providing circuit and a high-brightness slope providing circuit, and wherein the multiplying comprises utilizing the multiplier.

11. The method according to claim 10 wherein the adding is preceded by providing, to an adder, the selected approximating interval offset from a selected offset providing circuit out of a low-brightness offset providing circuit and a high-brightness offset providing circuit, and wherein the adding comprises utilizing the adder.

12. The method according to claim 10 wherein the number of low-brightness approximating intervals that belong to the group of low-brightness approximating intervals differs from a number of high-brightness approximating intervals that belong to the group of high-brightness approximating intervals.

13. The method according to claim 10 wherein the number of low-brightness approximating intervals that belong to the group of low-brightness approximating intervals exceeds five.

14. The method according to claim 9 wherein the adding is preceded by providing, to an adder, the selected approximating interval offset from a selected offset providing circuit out of a low-brightness offset providing circuit and a high-brightness offset providing circuit, and wherein the adding comprises utilizing the adder.

15. The method according to claim 9 wherein the number of low-brightness approximating intervals that belong to the group of low-brightness approximating intervals differs from a number of high-brightness approximating intervals that belong to the group of high-brightness approximating intervals.

16. The method according to claim 9 wherein the number of low-brightness approximating intervals that belong to the group of low-brightness approximating intervals exceeds five.

17. The method according claim 9 wherein a width of a low-brightness value range associated with the group of low-brightness approximating intervals is substantially equal to a width of high-brightness values associated with a single high-brightness approximating interval.

18. The method according claim 17 wherein a pixel is represented by multiple non-gamma compensated color component values; wherein method comprises performing the stages of selecting, multiplying and adding for the multiple non-gamma compensated color components in parallel.

19. The method according claim 9 wherein a pixel is represented by multiple non-gamma compensated color component values; wherein method comprises performing the stages of selecting, multiplying and adding for the multiple non-gamma compensated color components in parallel.

20. The method according to claim 9 further comprising defining the group of high-brightness approximating intervals and the group of low-brightness approximating intervals.

\* \* \* \* \*